(12) United States Patent
Pasupuleti et al.

(10) Patent No.: US 12,475,530 B2
(45) Date of Patent: Nov. 18, 2025

(54) METHOD AND ELECTRONIC DEVICE FOR PERFORMING AI BASED ZOOM OF IMAGE

(71) Applicant: SAMSUNG ELECTRONICS CO., LTD., Suwon-si (KR)

(72) Inventors: Sirish Kumar Pasupuleti, Bengaluru (IN); Raj Narayana Gadde, Bengaluru (IN); Sri Nitchith Akula, Bengaluru (IN); Avinab Saha, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 563 days.

(21) Appl. No.: 17/939,614

(22) Filed: Sep. 7, 2022

(65) Prior Publication Data

US 2023/0005104 A1 Jan. 5, 2023

Related U.S. Application Data

(63) Continuation of application No. PCT/KR2021/002721, filed on Mar. 5, 2021.

(30) Foreign Application Priority Data

Mar. 7, 2020 (IN) .............................. 202041009901
Jan. 19, 2021 (IN) .............................. 202041009901

(51) Int. Cl.
*G06T 3/4046* (2024.01)
*G06T 3/4053* (2024.01)

(52) U.S. Cl.
CPC .......... *G06T 3/4046* (2013.01); *G06T 3/4053* (2013.01)

(58) Field of Classification Search
CPC ... G06T 3/4053; G06T 3/4076; G06T 3/4069; G06T 3/4061
See application file for complete search history.

(56) References Cited

U.S. PATENT DOCUMENTS

| 9,984,325 | B1 | 5/2018 | Kim et al. |
| 11,057,585 | B2 | 7/2021 | Kim et al. |
| 2019/0220977 | A1 | 7/2019 | Zhou et al. |

(Continued)

FOREIGN PATENT DOCUMENTS

| CN | 108510560 A | 9/2018 |
| KR | 10-2014-0061028 A | 5/2014 |

OTHER PUBLICATIONS

Park, Jangsoo, Jongsuk Lee, and Donggyu Sim. "Low-complexity 1D-convolutional Neural Network for Super Resolution." IEIE Transactions on Smart Processing & Computing 8.6 (2019): 423-430. (Year: 2019).*

(Continued)

*Primary Examiner* — Raphael Schwartz
(74) *Attorney, Agent, or Firm* — Sughrue Mion, PLLC

(57) ABSTRACT

A method and an electronic device for performing an AI based zoom of an image in an electronic device are provided. The method includes receiving the image; obtaining, through a pixel domain neural network (NN) block, a first set of feature maps of the image based on pixels of the image; obtaining, through a frequency domain NN block, a second set of feature maps of the image based on frequencies of the image; and obtaining, through a joint refinement NN block, a final image with a resolution higher than a resolution of the image, based on the first set of feature maps and the second set of feature maps.

20 Claims, 13 Drawing Sheets

(56) References Cited

U.S. PATENT DOCUMENTS

2020/0026952 A1    1/2020  Kim
2020/0058106 A1    2/2020  Lazarus et al.
2021/0201017 A1    7/2021  Wakui

OTHER PUBLICATIONS

Chen, et al., "Image Super-Resolution Algorithm Based on Dual-Channel Convolutional Neural Networks", 2019, Applied Sciences, vol. 9, 16 pages total.

Zheng, et al., "Implicit Dual-domain Convolutional Network for Robust Color Image Compression Artifact Reduction", 2018, IEEE Transactions on Circuits and Systems for Video Technology, 14 pages total.

International Search Report (PCT/ISA/210) issued Jun. 17, 2021 by the International Searching Authority in International Application No. PCT/KR2021/002721.

Written Opinion (PCT/ISA/237) issued Jun. 17, 2021 by the International Searching Authority in International Application No. PCT/KR2021/002721.

Communication issued Jan. 12, 2022 by the Indian Patent Office in Indian Patent Application No. 202041009901.

\* cited by examiner

METHOD AND ELECTRONIC DEVICE FOR PERFORMING AI BASED ZOOM OF IMAGE

CROSS-REFERENCE TO RELATED APPLICATION(S)

This application is a continuation application of International Application No. PCT/KR2021/002721, filed on Mar. 5, 2021, which is based on and claims priority to Indian Complete Patent Application No. 202041009901, filed on Jan. 19, 2021, and Indian Provisional Patent Application No. 202041009901, filed on Mar. 7, 2020, the disclosures of which are incorporated by reference herein in their entireties.

BACKGROUND

1. Field

The present disclosure relates to image processing, and more specifically to a method and an electronic device for performing an artificial intelligence (AI) based zoom of an image.

2. Description of Related Art

A zooming feature of an imaging system such as a camera allows the imaging system to change smoothly from a long shot of a scene to a close-up shot (zooming in), and vice-versa (zooming out). In other words, zooming in decreases and/or narrows an apparent angle view of a digital photograph or video, and zooming out increases and/or widens an apparent angle view of the digital photograph or video. Digital zoom is a zooming technique that enables the imaging system to zoom in and zoom out of the scene without physically focusing the scene using lenses of the imaging system. In order to digitally zoom in to the scene, the imaging system enlarges an image of the scene or a portion of the image of the scene using conventional image processing techniques such as bilinear upscaling, bicubic upscaling, etc. Major shortcoming with the conventional technologies in zooming the image are a presence of artifacts such as jaggy edges, blurred details, overly smoothened edges, and washed-out appearances in a zoomed image. A Deep Neural Network (DNN) may be used as an alternative method for producing a high quality image for zooming. However, a computational complexity for producing the high quality images using the DNN is very high, e.g., more than 1 million operations per pixel, which is practically not feasible to implement in the imaging system with limited computational resources. Thus, it is desired to provide a useful alternative for digitally zooming the image.

SUMMARY

Provided are a method, an electronic device, and a non-transitory computer readable medium including instructions for performing an AI based zoom of an image. The method may allow the electronic device to produce a high resolution image of the image without generating artifacts such as jaggy edges, blurred details, overly smoothened edges, and washed-out appearances, etc. in the high resolution image.

The electronic device may include Edge Synthesis Blocks (ESBs) that may each include One Dimensional (1D) Convolution Neural Networks (CNNs) for performing an operation with lower complexity on the image or feature maps of the image. Therefore, the electronic device may easily perform operations for generating the high resolution image by using the ESBs, even with limited computational resources.

The method may allow the electronic device to analyze features of the image in multiple domains (e.g., pixel domain and frequency domain), extract the features of the image in the multiple domains, and choose optimal features from the extracted features for generating the high resolution image. In response to zooming a portion of the image, the electronic device may display a corresponding portion of the high resolution image. The image details in the corresponding portion will be very clear compared to an output of conventional image processing techniques, which improves a user experience in zooming the image.

According to an aspect of the disclosure, a method for performing an artificial intelligence (AI) based zoom of an image in an electronic device, includes: receiving the image; obtaining, through a pixel domain neural network (NN) block, a first set of feature maps of the image based on pixels of the image; obtaining, through a frequency domain NN block, a second set of feature maps of the image based on frequencies of the image; and obtaining, through a joint refinement NN block, a final image with a resolution higher than a resolution of the image, based on the first set of feature maps and the second set of feature maps.

The joint refinement NN block may learn kernel weights during a training phase, and update the kernel weights based on image characteristics in the first set of feature maps and the second set of feature maps, and the joint refinement NN block may include a set of edge synthesis blocks (ESBs).

The obtaining the first set of feature maps of the image may include: identifying a third set of feature maps of the image using a first set of edge synthesis blocks (ESBs) of the pixel domain NN block; extracting edges in the image; upscaling the edges to obtain a high resolution (HR) edge map; and obtaining the first set of feature maps of the image by filtering the third set of feature maps and the HR edge map using a second set of ESBs of the pixel domain NN block.

The first set of ESBs of the pixel domain NN block may learn a horizontal edge feature and a vertical edge feature of the image in separate network branches with one-dimensional (1D) convolution neural networks (CNNs).

The first set of ESBs of the pixel domain NN block may include a variable number of ESBs in cascaded arrangement with a local and global feature concatenation to learn edges in 360° directions.

The second set of ESBs of the pixel domain NN block may guide learned edge features in the third set of feature maps using the HR edge map to improve an edge consistency.

The obtaining the second set of feature maps of the image may include: converting the image to frequency components; classifying the frequency components of the image to at least one set of frequency components based on a similarity of the frequency components; determining a fourth set of feature maps for each set of frequency components using a first set of edge synthesis blocks (ESBs) in the frequency domain NN block; obtaining a fifth set of feature maps by filtering the fourth set of feature maps and frequency components of the first set of feature maps using a second set of ESBs in the frequency domain NN block; and converting the fifth set of feature maps to the second set of feature maps based on pixels of the image.

The frequency components may be classified to enable a deep learning model for learning in the frequency domain and extracting important features in local neighborhood characteristics.

The first set of ESBs of the frequency domain NN block may learn a local neighborhood frequency characteristics to reduce noise artefacts.

Each of the ESBs may include a plurality of cascaded one-dimensional (1D) convolution NNs neural networks (CNNs), a plurality of depth-wise separable CNNs, and a concatenate layer.

Outputs of each set of cascaded 1D CNNs may be input to corresponding depth-wise separable CNNs, and outputs of the corresponding depth-wise separable CNNs may be input to a final depth-wise separable CNN after performing concatenation on the outputs of the corresponding depth-wise separable CNNs using the concatenate layer.

According to an aspect of the disclosure, an electronic device for performing an AI based zoom of an image, includes: a memory; a processor; and an image zoom controller operably coupled to the memory and the processor, and configured to: receive the image, obtain, through a pixel domain neural network (NN) block, a first set of feature maps of the image based on pixels of the image, obtain, through a frequency domain NN block, a second set of feature maps of the image based on frequencies of the image, and obtain, through a joint refinement NN block, a final image with a resolution higher than the image, based on the first set of feature maps and the second set of feature maps.

The joint refinement NN block may learn kernel weights during a training phase, and update the kernel weights based on image characteristics in the first set of feature maps and the second set of feature maps, wherein the joint refinement NN block may include a set of edge synthesis blocks (ESBs).

The image zoom controller may be further configured to: obtain a third set of feature maps of the image using a first set of edge synthesis blocks (ESBs) of the pixel domain NN block; extract edges in the image; upscale the edges to obtain a high resolution (HR) edge map; and obtain the first set of feature maps of the image by filtering the third set of feature maps and the HR edge map using a second set of ESBs of the pixel domain NN block.

The image zoom controller may be further configured to: convert the image to frequency components; classify the frequency components of the image to at least one set of frequency components based on a similarity of the frequency components; obtain a fourth set of feature maps for each set of frequency components using a first set of edge synthesis blocks (ESBs) in the frequency domain NN block; obtain a fifth set of feature maps by filtering the fourth set of feature maps and frequency components of the first set of feature maps using a second set of ESBs in the frequency domain NN block; and convert the fifth set of feature maps to the second set of feature maps based on pixels of the image According to an aspect of the disclosure, a method for performing an artificial intelligence (AI) based zoom of an image in an electronic device, includes: receiving the image; obtaining, through a pixel domain neural network (NN) block, a first set of feature maps of the image based on pixels of the image; obtaining, through a frequency domain NN block, a second set of feature maps of the image based on frequencies of the image; and obtaining, through a joint refinement NN block, a final image with a resolution higher than a resolution of the image, based on the first set of feature maps and the second set of feature maps.

The joint refinement NN block may learn kernel weights during a training phase, and update the kernel weights based on image characteristics in the first set of feature maps and the second set of feature maps, and the joint refinement NN block may include a set of edge synthesis blocks (ESBs).

The obtaining the first set of feature maps of the image may include: identifying a third set of feature maps of the image using a first set of edge synthesis blocks (ESBs) of the pixel domain NN block; extracting edges in the image; upscaling the edges to obtain a high resolution (HR) edge map; and obtaining the first set of feature maps of the image by filtering the third set of feature maps and the HR edge map using a second set of ESBs of the pixel domain NN block.

The first set of ESBs of the pixel domain NN block may learn a horizontal edge feature and a vertical edge feature of the image in separate network branches with one-dimensional (1D) convolution neural networks (CNNs).

The first set of ESBs of the pixel domain NN block may include a variable number of ESBs in cascaded arrangement with a local and global feature concatenation to learn edges in 360° directions.

The second set of ESBs of the pixel domain NN block may guide learned edge features in the third set of feature maps using the HR edge map to improve an edge consistency.

The obtaining the second set of feature maps of the image may include: converting the image to frequency components; classifying the frequency components of the image to at least one set of frequency components based on a similarity of the frequency components; determining a fourth set of feature maps for each set of frequency components using a first set of edge synthesis blocks (ESBs) in the frequency domain NN block; obtaining a fifth set of feature maps by filtering the fourth set of feature maps and frequency components of the first set of feature maps using a second set of ESBs in the frequency domain NN block; and converting the fifth set of feature maps to the second set of feature maps based on pixels of the image.

The frequency components may be classified to enable a deep learning model for learning in the frequency domain and extracting important features in local neighborhood characteristics.

The first set of ESBs of the frequency domain NN block may learn a local neighborhood frequency characteristics to reduce noise artefacts.

Each of the ESBs may include a plurality of cascaded one-dimensional (1D) convolution NNs neural networks (CNNs), a plurality of depth-wise separable CNNs, and a concatenate layer.

Outputs of each set of cascaded 1D CNNs may be input to corresponding depth-wise separable CNNs, and outputs of the corresponding depth-wise separable CNNs may be input to a final depth-wise separable CNN after performing concatenation on the outputs of the corresponding depth-wise separable CNNs using the concatenate layer.

According to an aspect of the disclosure, an electronic device for performing an AI based zoom of an image, includes: a memory; a processor; and an image zoom controller operably coupled to the memory and the processor, and configured to: receive the image, obtain, through a pixel domain neural network (NN) block, a first set of feature maps of the image based on pixels of the image, obtain, through a frequency domain NN block, a second set of feature maps of the image based on frequencies of the image, and obtain, through a joint refinement NN block, a final image with a resolution higher than the image, based on the first set of feature maps and the second set of feature maps.

The joint refinement NN block may learn kernel weights during a training phase, and update the kernel weights based on image characteristics in the first set of feature maps and the second set of feature maps, wherein the joint refinement NN block may include a set of edge synthesis blocks (ESBs).

The image zoom controller may be further configured to: obtain a third set of feature maps of the image using a first set of edge synthesis blocks (ESBs) of the pixel domain NN block; extract edges in the image; upscale the edges to obtain a high resolution (HR) edge map; and obtain the first set of feature maps of the image by filtering the third set of feature maps and the HR edge map using a second set of ESBs of the pixel domain NN block.

The image zoom controller may be further configured to: convert the image to frequency components; classify the frequency components of the image to at least one set of frequency components based on a similarity of the frequency components; obtain a fourth set of feature maps for each set of frequency components using a first set of edge synthesis blocks (ESBs) in the frequency domain NN block; obtain a fifth set of feature maps by filtering the fourth set of feature maps and frequency components of the first set of feature maps using a second set of ESBs in the frequency domain NN block; and convert the fifth set of feature maps to the second set of feature maps based on pixels of the image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
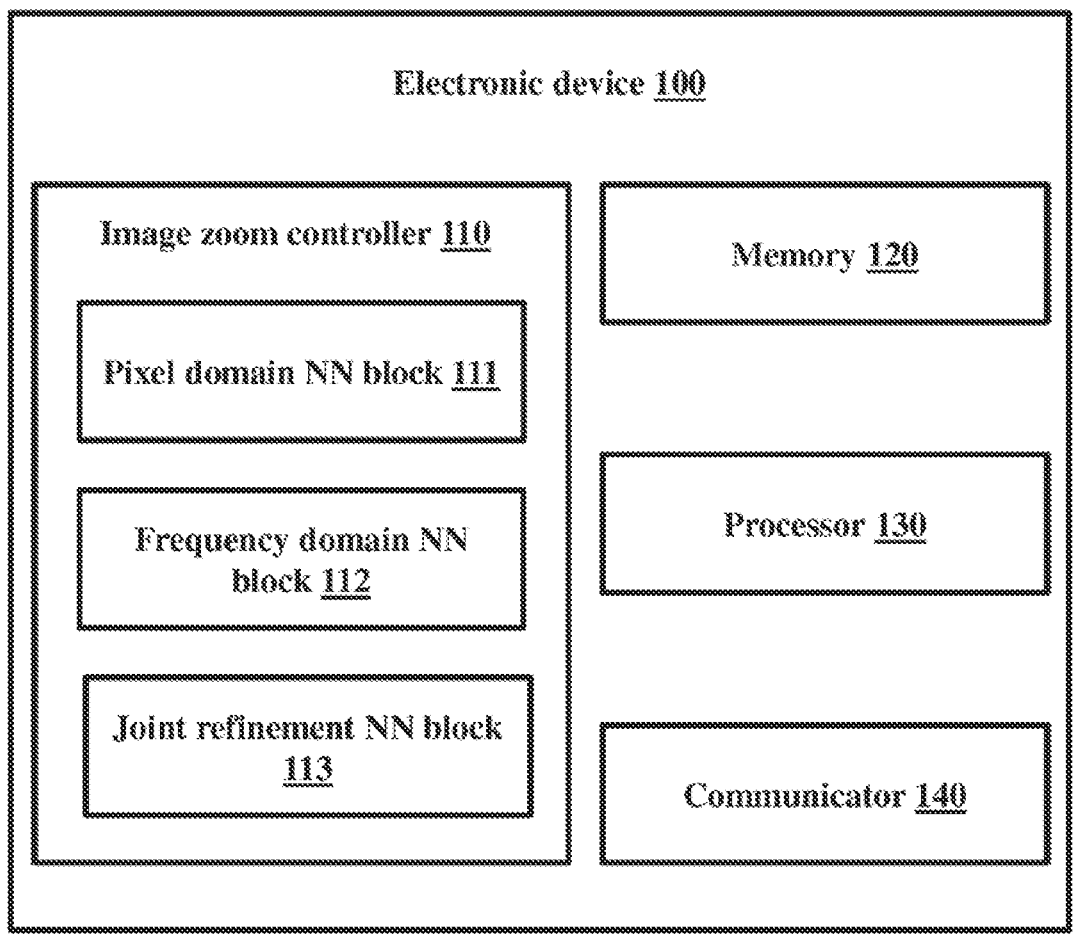
FIG. 1 illustrates a block diagram of an electronic device for performing an AI based zoom of an image, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for performing an AI based zoom of an image (e.g., a low resolution (LR) image) in an electronic device. The method includes receiving, by the electronic device, the image. The method includes modifying, by the electronic device, the image using a pixel domain neural network (NN) block to create a first set of feature maps of the image. The method includes modifying, by the electronic device, the image using a frequency domain NN block to create a second set of feature maps of the image. The method includes generating, by the electronic device, the first set of feature maps and the second set of feature maps using edge synthesis blocks (ESBs) at a lower computational complexity. The method includes generating, by the electronic device, a final image (e.g., a high resolution (HR) image) with a resolution higher than the image by passing the first set of feature maps and the second set of feature maps to a joint refinement NN block.

Accordingly, the embodiments herein provide the electronic device for performing the AI based zoom of the image. The electronic device includes an image zoom controller, a memory, a processor, where the image zoom controller is coupled to the memory and the processor. The image zoom controller is configured to receive the image. The image zoom controller is configured to modify the image using the pixel domain NN block to create the first set of feature maps of the image. The image zoom controller is configured to modify the image using the frequency domain NN block to create the second set of feature maps of the image. The image zoom controller is configured to generate the first set of feature maps and the second set of feature maps using the ESBs at the lower computational complexity. The image zoom controller is configured to generate the final image with the resolution higher than the image by passing the first set of feature maps and the second set of feature maps to the joint refinement NN block.

According to an aspect of the present disclosure, the electronic device may produce a high resolution image of a low resolution image without generating artifacts such as jaggy edges, blurred details, overly smoothened edges, and washed-out appearances, etc. in the high resolution image.

According to an aspect of the present disclosure, the electronic device may include the ESBs for performing image processing with lower complexity using the 1D CNNs to zoom the image. Therefore, the electronic device with limited computational resources may easily perform operations for generating the high resolution image.

According to an aspect of the present disclosure, the electronic device analyzes features of the image in multiple domains, e.g., pixel domain and frequency domain. The method allows the electronic device to extract the features of the image in the multiple domains and choose optimal features from the extracted features for generating the high resolution image. In response to zooming a portion of the image, the electronic device displays a corresponding portion of the high resolution image. The image details in the corresponding portion of the high resolution image generated by the electronic device will be very clear compared to an output of conventional image processing techniques, which improves a user experience in zooming the image.

Hereinafter, embodiments of the present disclosure will be described in detail with reference to the accompanying drawings.

FIG. 1 illustrates a block diagram of an electronic device (100) for performing an AI based zoom of an image (e.g., LR image 303), according to an embodiment. Examples of the electronic device (100) may include, but are not limited to, a smart phone, a tablet computer, a personal digital assistance (PDA), a desktop computer, a wearable device, a camera, a projector, an Internet of Things (IoT) device, etc. In an embodiment, the electronic device (100) includes an image zoom controller (110), a memory (120), a processor (130), and a communicator (140). The image zoom controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the image zoom controller (110) includes a pixel domain NN block (111), a frequency domain NN block (112), and a joint refinement NN block (113). The pixel domain NN block (111), the frequency domain NN block (112), and the joint refinement NN block (113) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The pixel domain NN block (111) refers to a block for obtaining a first set of feature maps of the image based on pixels of the image. The frequency domain NN block (112) refers to a block for obtaining a second set of feature maps of the image based on frequencies of the image. The joint refinement NN block (113) refers to a block for generating a final image (e.g., HR image 305) with a resolution higher than the image based on the first set of feature maps and the second set of feature maps. In the disclosure, the pixel domain NN block (111), the frequency domain NN block (112) and the joint refinement NN block (113) may be referred to as 'a first NN block', 'a second NN block', and 'a third NN block', respectively.

The image zoom controller (110) is configured to receive the image (303). In an embodiment, the image zoom controller (110) is configured to receive the image (303) from an imaging sensor (e.g. complementary metal oxide Semiconductor (CMOS) imaging sensor) of the electronic device (100) in real time. In another embodiment, the image zoom controller (110) is configured to receive the image (303) from the memory (120). The image zoom controller (110) is configured to modify the image (303) using the pixel domain NN block (111) (refer to FIG. 4 for more details) to create a first set of feature maps of the image (303). The image zoom controller (110) is configured to determine a third set of feature maps of the image (303) using a first set of ESBs (401-403) of the pixel domain NN block (111). In an embodiment, the first set of ESBs (401-403) of the pixel domain NN block (111) explicitly learns a horizontal edge feature and a vertical edge feature of the image (303) in separate network branches (610, 611) with 1D CNNs (601-604) (refer to FIG. 6 for more details).

In the disclosure, an ESB refers to a block for extracting and classifying various edge features of an image for synthesizing a high resolution image according to various embodiments of the disclosure. The electronic device (100) may comprise a first set of ESBs (401-403) (a first set of ESBs in the pixel domain NN block (111)), a second set of ESBs (404-406) (a second set of ESBs in the pixel domain NN block (111)), a third set of ESBs (407-409) (a first set of ESBs in the frequency domain NN block (112)), a fourth set of ESBs (410-412) (a second set of ESBs in the frequency domain NN block (112)), and a fifth set of ESBs (413-415) (a set of ESBs in the joint refinement NN block (113)). Each set of ESBs will be described in detail in the description of each block including each set of ESBs. The ESBs may comprise One Dimensional (1D) Convolution Neural Networks (CNNs) configured to obtain output data using input data and a 1D kernel.

The image zoom controller (110) is configured to extract edges in the image (303). The image zoom controller (110) is configured to upscale the edges to generate a HR edge map. The image zoom controller (110) is configured to generate the first set of feature maps of the image (303) by filtering the third set of feature maps and the HR edge map using the second set of ESBs (404-406) of the pixel domain NN block (111). In an embodiment, the second set of ESBs (404-406) of the pixel domain NN block (111) guides learned edge features in the third set of feature maps using the HR edge map to improve an edge consistency. The HR edge map helps the learning process by providing explicit edge details present in an input LR image, so that the learned features may not miss these important features present in the current input image while learning various other features learned over a training dataset. Hence, the HR edge map generated from the LR image acts as a guide to the learning process to make use of these and enhance the learning process.

The image zoom controller (110) is configured to modify the image (303) using the frequency domain NN block (112) to create a second set of feature maps of the image (303). In an embodiment, the image zoom controller (110) is configured to convert the image (303) to frequency components. In an embodiment, the frequency components are classified to enable a deep learning model for learning in the frequency domain and extracting important features adaptively based on the local neighborhood characteristics. A pixel to frequency domain conversion using a block based transform will result in various frequency components arranged in a Two Dimensional (2D) fashion for 2D input images. Each adjacent frequency coefficient represents a different frequency component extracted from the pixel domain block. Processing these dissimilar frequency components spatially together may limit the feature extraction ability and thereby limit the learning process, particularly for NNs with less complexity/parameters. To enhance the learning capability, the frequency coefficients are rearranged such that similar frequency coefficients are spatially grouped together.

An image may have different regions containing various characteristics such as plain, texture, etc., and the proposed frequency domain processing may enhance the NN ability to extract important features adaptive to the characteristics present in a local spatial region of the image. The image zoom controller (110) is configured to classify the frequency components of the image (303) to different set of frequency components based on a similarity of the frequency components. The image zoom controller (110) is configured to determine a fourth set of feature maps for each set of frequency components using a first set of ESBs (407-409) in the frequency domain NN block (112). In an embodiment, the first set of ESBs (407-409) of the frequency domain NN block (112) learns a local neighborhood frequency characteristics to reduce noise artefacts.

The image zoom controller (110) is configured to generate a fifth set of feature maps by filtering the fourth set of feature maps and frequency components of the first set of feature maps using a second set of ESBs (410-412) in the frequency domain NN block (112). The image zoom controller (110) is configured to convert the fifth set of feature maps to the second set of feature maps comprising pixels. The image zoom controller (110) is configured to generate a final image (305) with a resolution higher than the image (303) by passing the first set of feature maps and the second set of feature maps to the joint refinement NN block (113). In an embodiment, the joint refinement NN block (113) learns kernel weights during a training phase, and updates the kernel weight based on a best feature in the first set of feature maps and the second set of feature maps, wherein the joint refinement NN block (113) comprises a set of ESBs (413-415). In the disclosure, best feature refers to important image characteristics which are present in the ground truth images and are learned in training phase via supervised learning manner using an objective loss function. An objective loss function measures the error between CNN output and ground truth, wherein, the objective of supervised training is to minimize the loss function and thereby the error. The image zoom controller (110) is configured to receive an input to zoom a portion of the image (303). The image zoom controller (110) is configured to display a portion of the final image (305) corresponds to the portion of the image (303). In an example, a display such as a Light Emitting Diode (LED) screen may be used to display the portion of the final image (305) by including the display to the electronic device (100). When the electronic device (100) is other than the projector, the projector may be used to display the portion of the final image (305) by connecting the projector to the electronic device (100). In an embodiment, the first set of ESBs (401-403), the second set of ESBs (404-406), the first set of ESBs (407-409), the second set of ESBs (410-412), and the set of ESBs (413-415) include a variable number of ESBs in cascaded arrangement with a local and global feature concatenation to learn edges in 360° direction (refer to FIG. 4 for more details). Each ESB (401-415) explicitly learns a horizontal edge feature and a vertical edge feature of the image (303) or an input feature map in separate network branches (610, 611) with the 1D CNNs (601-604) (refer to FIG. 6 for more details).

A function associated with ESB (401-415) may be performed through the memory (120), and the processor (130). The processor (130) is configured to execute instructions stored in the memory (120). The processor (130) may include multiple cores to execute the instructions. The processor (130) may include one or a plurality of processors. At this time, one or a plurality of processors may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU).

In an embodiment, the one or a plurality of processors control processing of the input data in accordance with a predefined operating rule or ESB (401-415) stored in the memory (120). The predefined operating rule or ESB (401-415) is provided through training or learning.

Here, being provided through learning means that, by applying a learning method to a plurality of learning data, a predefined operating rule or ESB (401-415) of a desired characteristic is made. The learning may be performed in the electronic device (100) itself in which the ESB (401-415) according to an embodiment is performed, and/or may be implemented through a separate server/system. The learning method is a method for training a predetermined target device (for example, a robot). The electronic device (100) uses a plurality of learning data to cause, allow, or control the target device to make a determination or prediction. Examples of learning methods include, but are not limited to, supervised learning, unsupervised learning, semi-supervised learning, or reinforcement learning.

The ESB (401-415) may consist of a plurality of neural network layers. Each layer has a plurality of weight values and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The memory (120) stores the final image (305) and the image (303). The memory (120) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory (120) may, in some examples, be a non-transitory storage medium. The term "non-transitory" indicates that the storage medium is not embodied in a carrier wave or a propagated signal. However, the term "non-transitory" should not be interpreted that the memory (120) is non-movable. In certain examples, a non-transitory storage medium may store data that can, over time, change (e.g., in Random Access Memory (RAM) or cache).

The communicator (140) is configured to communicate internally between hardware components in the electronic device (100). Further, the communicator (140) is configured to facilitate the communication between the electronic device (100) and other devices. The communicator (140) includes an electronic circuit specific to a standard that enables wired or wireless communication.

Although the FIG. 1 shows the hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components may be combined together to perform same or substantially similar function for performing the AI based zoom of the image (303).

Figure 2:
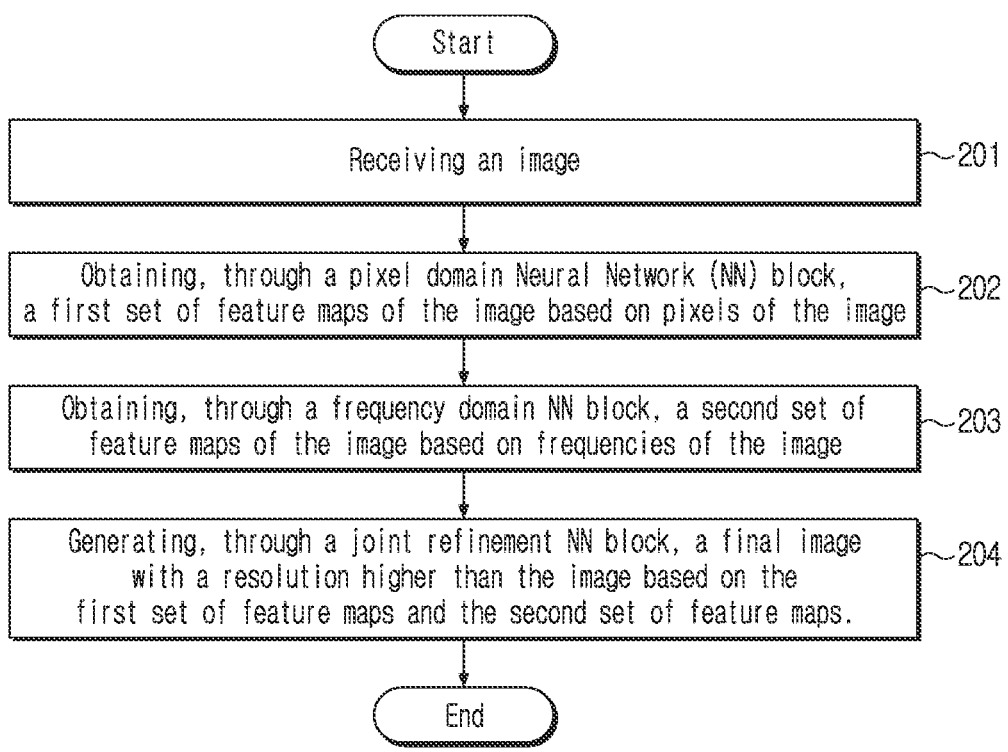
FIG. 2 illustrates a flow diagram of a method for performing an AI based zoom of an image, according to an embodiment.

FIG. 2 illustrates a flow diagram (200) of a method for performing an AI based zoom of an image (e.g., LR image 303), according to an embodiment. At step 201, the method includes receiving the image (303). In an embodiment, the method allows the pixel domain NN block (111) and the frequency domain NN block (112) to receive the image (303). At step 202, the method includes obtaining, through the pixel domain NN block (111), the first set of feature maps of the image (303) based on pixels of the image. In other words, the electronic device (100) may modify the image (303) using the pixel domain NN block (111) to create the first set of feature maps of the image (303). At step 203, the method includes obtaining, through the frequency domain NN block (112), the second set of feature maps of the image (303) based on frequencies of the image. In other words, the electronic device (100) may modify the image (303) using the frequency domain NN block (112) to create the second set of feature maps of the image. At step 204, the method includes generating, through the joint refinement NN block (113), a final image (e.g., HR image 305) with a resolution higher than the image (303) based on the first set of feature maps and the second set of feature maps. In other words, the electronic device (100) may generate the final image (305) with the resolution higher than the image (303) by passing the first set of feature maps and the second set of feature maps to the joint refinement NN block (113).

The various actions, acts, blocks, steps, or the like in the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
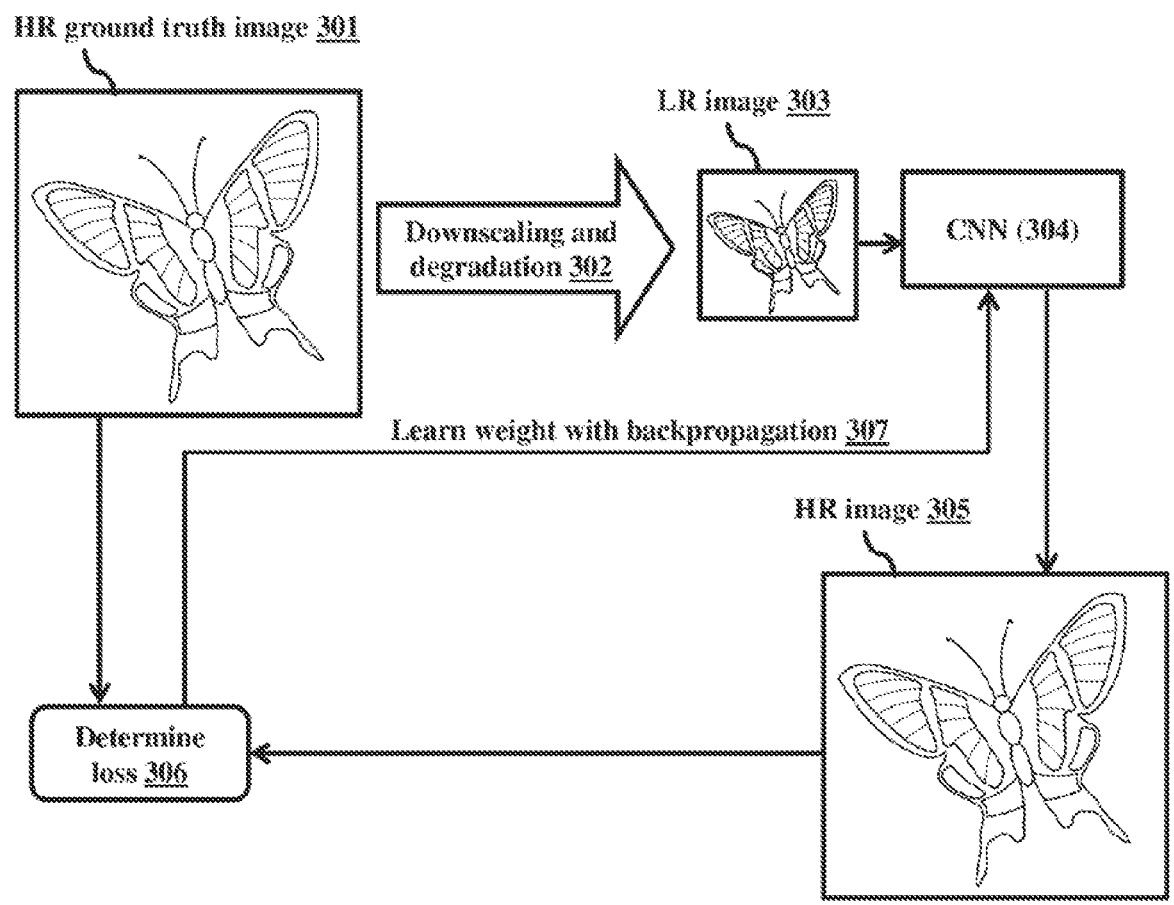
FIG. 3 illustrates an overview of a method for learning weight adjustments for a CNN to generate a high resolution image from a low resolution image, according to an embodiment.

FIG. 3 illustrates an overview of a method for learning weight adjustments for a CNN (304) to generate a high resolution image (e.g., HR image 305) from a low resolution image (e.g., LR image 303), according to an embodiment. A resolution of the LR image (303) is lower than a resolution of the HR image (305). The CNN (304) may refer to any one of the 1D CNNs (601-604) of each ESB (401-415).

Referring to FIG. 3, the electronic device (100) receives a HR ground truth image (301). At step 302, the electronic device (100) downscales and degrades the HR ground truth image (301) to generate the LR image (303). The electronic device (100) initially generates the HR image (305) based on the LR image (303) using the CNN (304) with default weights. At step 306, the electronic device (100) determines a loss (e.g., pixel loss) in a quality occurred in the HR image (305) compared to the HR ground truth image (301). At step 307, the electronic device (100) learns new weights and modifies the default weights of the CNN (304) to a different value. Further, the electronic device (100) repeats steps of generating the HR image (305) using the CNN (304) with the modified weights, determining the loss in a quality, and modifying the weights for learning optimal weights to produce the HR image (305) without the loss compared to the HR ground truth image (301). The method ends in response to determining by the electronic device (100) the optimal weights of the CNN for generating the HR image (305) without the loss compared to the HR ground truth image (301).

According to an aspect of the present disclosure, the learned kernel of the CNN (304) may be used to extract wide range of edge features. The learned kernel is robust and invariant of image rotation, scale, brightness changes, etc. The learned kernel achieves high quality images for wide range of input images with low quality. The electronic device (100) learns the kernel of the CNN (304) by training over a training dataset (e.g., a plurality of different HR ground truth images) against a loss function, and updating the weights using backpropagation.

Figure 4:
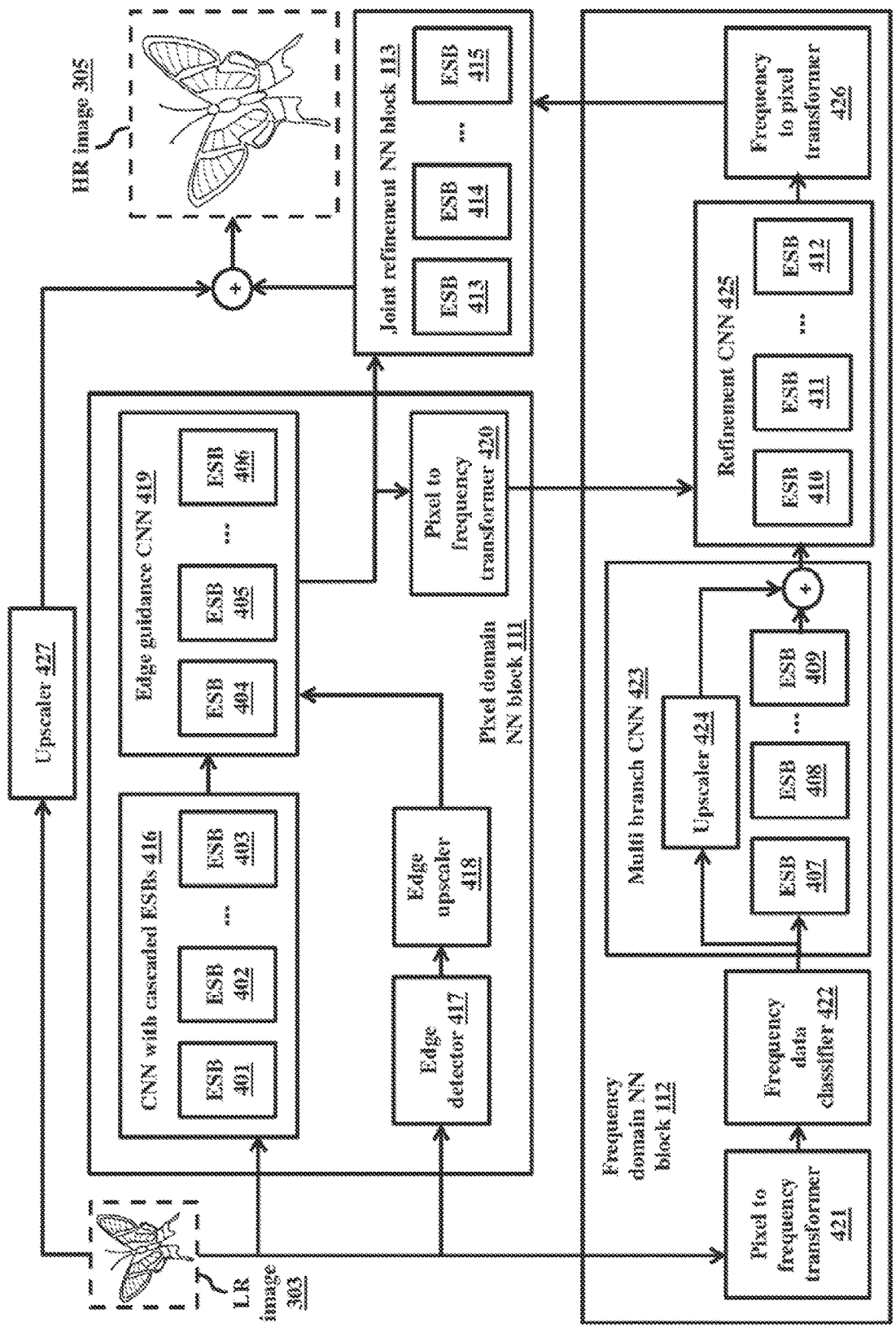
FIG. 4 illustrates an architectural diagram of an image zoom controller for generating a high resolution image from a low resolution image, according to an embodiment.

FIG. 4 illustrates an architectural diagram of an image zoom controller (110) for generating a high resolution image (e.g., HR image 305) from a low resolution image (e.g., LR image 303), according to an embodiment. In another embodiment, the image zoom controller (110) includes the pixel domain NN block (111), the frequency domain NN block (112), the joint refinement NN block (113), and an upscaler (427). The pixel domain NN block (111) includes a CNN with cascaded ESBs (416), an edge detector (417), an edge upscaler (418), an edge guidance CNN (419), and a pixel to frequency transformer (420). The CNN with cascaded ESBs (416) includes the first set of ESBs (401-403). The CNN with cascaded ESBs (416) receives the LR image (303) and generates the third set of feature maps of the LR image (303). Further, the CNN with cascaded ESBs (416) provides the third set of feature maps to the edge guidance CNN (419).

The edge detector (417) receives the LR image (303) and extracts edges of objects in the LR image (303). Further, the edge upscaler (418) upscales or up-samples the edges of the objects using methods such as bilinear upscaling, bicubic upscaling, etc. to generate the HR edge map. Further, the edge upscaler (418) provides the upscaled/up-sampled edges to the edge guidance CNN (419). The edge guidance CNN (419) includes the second set of ESBs (404-406). The edge guidance CNN (419) generates the first set of feature maps by filtering the third set of feature maps and the HR edge map using the second set of ESBs (404-406). The edge guidance CNN (419) uses the HR edge map for determining missing high frequency information in the third set of feature maps and improves overall zoom quality at low complexity.

Further, the edge guidance CNN (419) provides the first set of feature maps to the joint refinement NN block (113)

and the pixel to frequency transformer (420). The pixel to frequency transformer (420) converts pixels of the first set of feature maps to the frequency components. The joint refinement NN block (113) includes the fifth set of ESBs (413-415).

The frequency domain NN block (112) includes a pixel to frequency transformer (421), a frequency data classifier (422), a multi branch CNN (423), a refinement CNN (425), and a frequency to pixel transformer (426). The multi branch CNN (423) includes an upscaler (424) and the third set of ESBs (407-409). The pixel to frequency transformer (421) receives the LR image (303) and converts pixels of the LR image (303) to the frequency components. Further, the frequency data classifier (422) classifies the frequency components of the image (303) to different set of frequency components based on the similarity of the frequency components. The multi branch CNN (423) determines the fourth set of feature maps for each set of frequency components using the third set of ESBs (407-409). The upscaler (424) upscales the set of frequency components. The multi branch CNN (423) uses output of the upscaler (424) for learning and obtaining the optimal weights of the third set of ESBs (407-409) for generating the fourth set of feature maps. The multi branch CNN (423) provides the fourth set of feature maps to the refinement CNN (425).

The refinement CNN (425) includes the fourth set of ESBs (410-412). The refinement CNN (425) generate the fifth set of feature maps by filtering the fourth set of feature maps using the fourth set of ESBs (410-412) and the frequency components of the first set of feature maps. The frequency to pixel transformer (426) converts the frequency components of the fifth set of feature maps to the pixels to form the second set of feature maps. Further, the frequency to pixel transformer (426) provides the second set of feature maps to the joint refinement NN block (113). The joint refinement NN block (113) generates the HR image (305) using the first set of feature maps and the second set of feature maps. The joint refinement NN block (113) processes the first set of feature maps and the second set of feature maps and updates the kernel weights based on important features of both feature maps to enhances output quality of the HR image (305). The joint refinement NN block (113) produces a weighted combination of both feature maps, where the weight is learned during the training phase.

The upscaler (427) upscales/up-samples the LR image (303) to generate an upscaled/up-sampled image corresponding to the LR image (303) using the methods such as bilinear upscaling, bicubic upscaling, etc. The joint refinement NN block (113) uses the output (e.g., upscaled/up-sampled image) of the upscaler (427) for learning and obtaining the optimal weights of the fifth set of ESBs (413-415). In an embodiment, the first set of ESBs (401-403), the second set of ESBs (404-406), the third set of ESBs (407-409), the fourth set of ESBs (410-412), and the fifth set of ESBs (413-415) each include a variable number of ESBs in cascaded arrangement with a local and global feature concatenation to learn edges in 360° direction. Each ESB (401-415) explicitly learns the horizontal edge feature and the vertical edge feature of an input image or an input feature map in separate network branches (610, 611) with the 1D CNNs (601-604).

Figure 5:
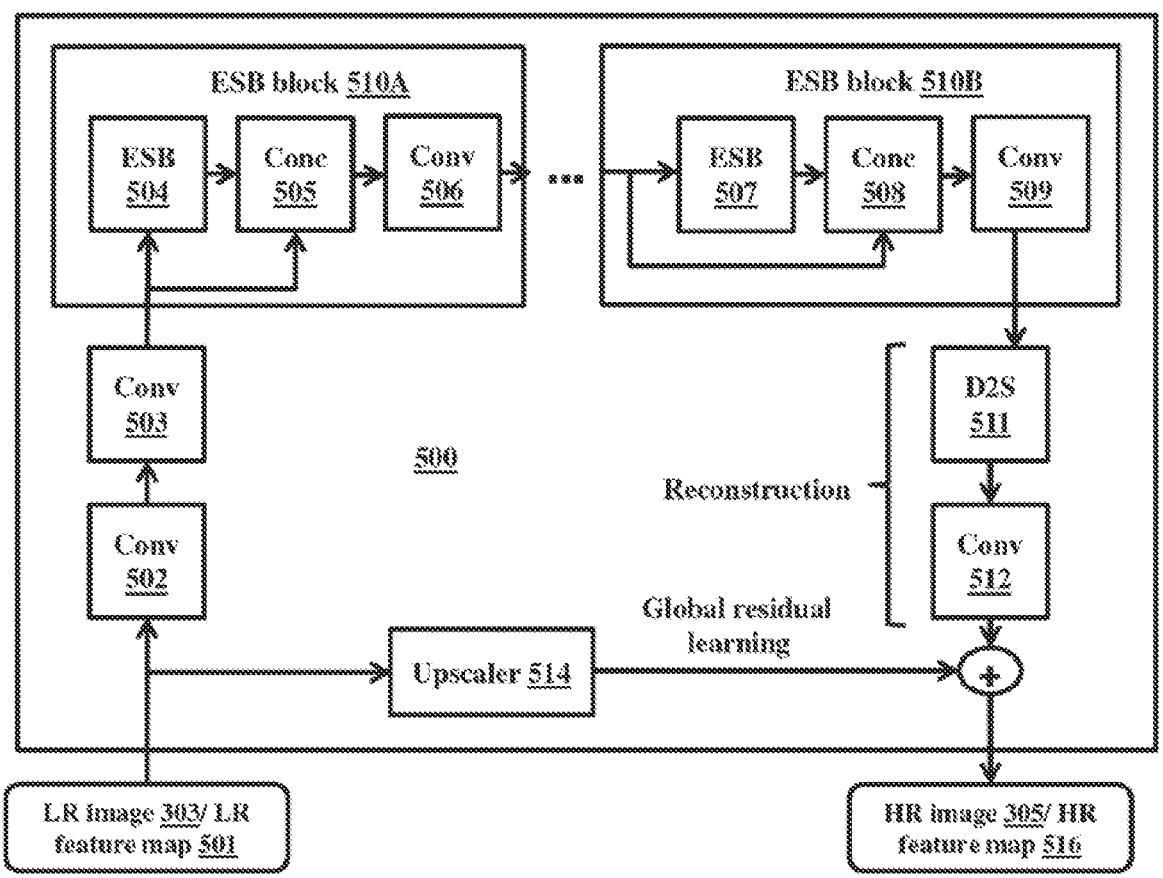
FIG. 5 illustrates an architectural diagram of a CNN, according to an embodiment.

FIG. 5 illustrates an architectural diagram of a CNN (500), according to an embodiment. The CNN (500) may refer to any one of the CNN with cascaded ESBs (416), the edge guidance CNN (419), the multi branch CNN (423), the refinement CNN (425), and the joint refinement CNN (113). As shown in FIG. 5, a general architecture (500) includes convolution layers (502, 503, 512), a Depth-to-Space (D2S) layer (511), an upscaler (514), and ESB blocks (510A, 510B). The convolution layers (502, 503) are cascaded, where the convolution layer (502) receives the LR image (303) or an LR feature map (501). The convolution layers (502, 503) perform convolution on the LR image (303) or the LR feature map (501), generates feature maps, and provides the feature maps to the ESB block (510A). A number of cascaded ESB blocks (510A, 510B) in the CNN may be different for each of the CNN with cascaded ESBs (416), the edge guidance CNN (419), the multi branch CNN (423), the refinement CNN (425), and the joint refinement CNN (113). For example, the CNN (500) may include one or more additional ESB blocks cascaded between the ESB blocks (510A, 510B).

The ESB block (510A) includes an ESB (504), a concatenation layer (505), and a convolution layer (506), where the ESB (504), the concatenation layer (505), and the convolution layer (506) are connected in series. The ESB (504) and the concatenation layer (505) receive the feature maps from the convolution layer (503). The ESB (504) generates feature maps using the feature maps of the concatenation layer (505). Further, the concatenation layer (505) performs concatenation on the feature maps of the ESB (504) using the feature maps of the convolution layer (503). Further, the convolution layer (506) performs convolution on the concatenated feature maps from the concatenation layer (505) and generates feature maps. The ESB block (510A) provides the feature maps from the convolution layer (506) to the ESB block (510B). The ESB block (510B) includes an ESB (507), a concatenation layer (508), and a convolution layer (509), where the ESB (507), the concatenation layer (508), and the convolution layer (509) are connected in series.

The ESB (507) and the concatenation layer (508) receives the feature maps from the convolution layer (506). The ESB (507) generates feature maps using the feature maps of the concatenation layer (506). Further, the concatenation layer (508) performs concatenation on the feature maps of the ESB (507) using the feature maps of the convolution layer (506). Further, the convolution layer (509) performs convolution on the concatenated feature maps from the concatenation layer (508) and generates feature maps. The ESB block (510A) provides the feature maps from the convolution layer (509) to the D2S layer (511). The D2S layer (511) and the convolution layer (512) reconstructs the HR image (305) or the HR feature map (516) using the feature map of the convolution layer (509).

The upscaler (514) generates the high resolution of the of the LR image (303) or the LR feature map (501) using the methods such as bilinear upscaling, bicubic upscaling, etc. The ESBs (504, 507) modifies weights of the CNNs of the ESBs (504, 507) for obtaining the optimal weights based on the loss in quality between the high resolution image and the reconstructed HR image (305). The ESBs (504, 507) uses a global residual learning method for determining the optimal weights. In response to obtaining the optimal weights, the ESBs (504, 507) generates feature maps based on the optimal weights. Therefore, the D2S layer (511) and the convolution layer (512) may reconstruct the HR image (305) with an optimal quality.

Figure 6:
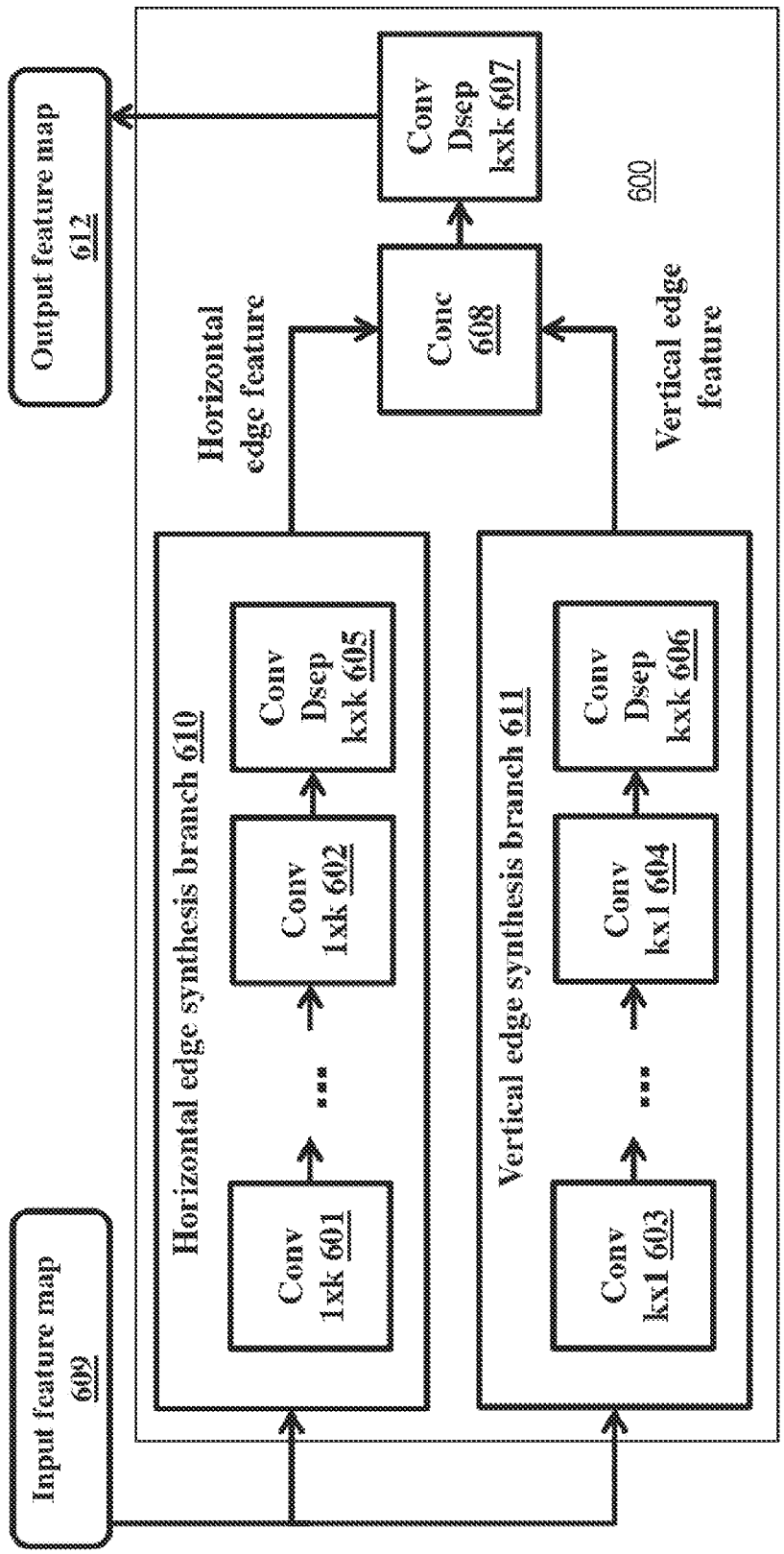
FIG. 6 illustrates an architectural diagram of an ESB for generating a feature map, according to an embodiment.

FIG. 6 illustrates an architectural diagram of an ESB (600) for generating a feature map (e.g., output feature map 612), according to an embodiment. The ESB (600) may refer to any one of the ESBs (504, 507). The ESB (600) includes a horizontal edge synthesis branch (610), a vertical edge synthesis branch (611), a concatenation layer (608), and a depth-wise separable convolution layer (607) of size k×k, where k is a natural number. The horizontal edge synthesis branch (610) and the vertical edge synthesis branch (611) receive an input feature map (609) (e.g., the feature map from the convolution layer (503) or the convolution layer (506)). The horizontal edge synthesis branch (610) extracts the edge in the input feature map (609) in a horizontal direction. In an embodiment, the horizontal edge synthesis branch (610) includes convolution layers (601-602) of size 1×k and a depth-wise separable convolution layer (605) of size k×k. The convolution layers (601-602) are connected in series. The convolution layer (601) receives the input feature map (609) and performs convolution on the input feature map (609) to generate feature maps. The convolution layer (602) receives the feature maps of the convolution layer (601) and performs convolution on the feature map of the convolution layer (601) to generate feature maps. The depth-wise separable convolution layer (605) receives the feature maps of the convolution layer (602) and performs a depth-wise separable convolution on the feature map of the convolution layer (602) to generate the edge features.

The vertical edge synthesis branch (611) extracts the edge in the input feature map (609) in a vertical direction. In an embodiment, the vertical edge synthesis branch (611) includes convolution layers (603-604) of size k×1 and a depth-wise separable convolution layer (606) of size k×k. The convolution layers (603-604) are connected in series. The convolution layer (603) receives the input feature map (609) and performs convolution on the input feature map (609) to generate feature maps. The convolution layer (604) receives the feature maps of the convolution layer (603) and performs convolution on the feature map of the convolution layer (603) to generate feature maps. The depth-wise separable convolution layer (606) receives the feature maps of the convolution layer (604) and performs the depth-wise separable convolution on the feature map of the convolution layer (604) to generate the edge features. The concatenation layer (608) performs concatenation on the edge features of the horizontal edge synthesis branch (610) and the edge features of the vertical edge synthesis branch (610) to learn edges features in all directions and generate feature maps. Further, the depth-wise separable convolution layer (607) performs the depth-wise separable convolution on the feature maps of the concatenation layer (608) to generate the output feature map (612).

Figure 7A:
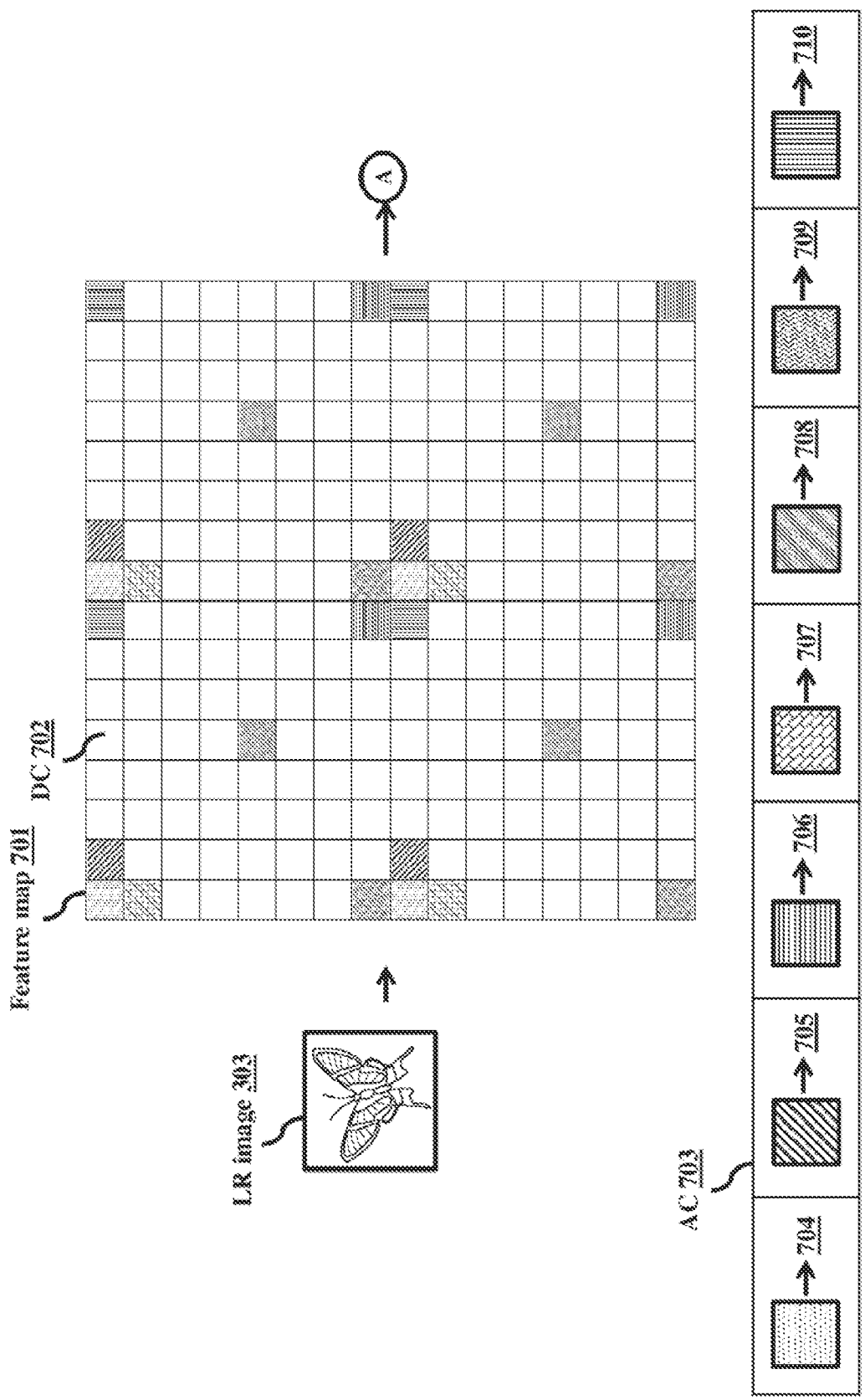
FIG. 7A and FIG. 7B illustrate a flow diagram of a method for creating a second set of feature maps of a low resolution image by modifying the low resolution image using a frequency domain NN block, according to an embodiment.
Figure 7B:
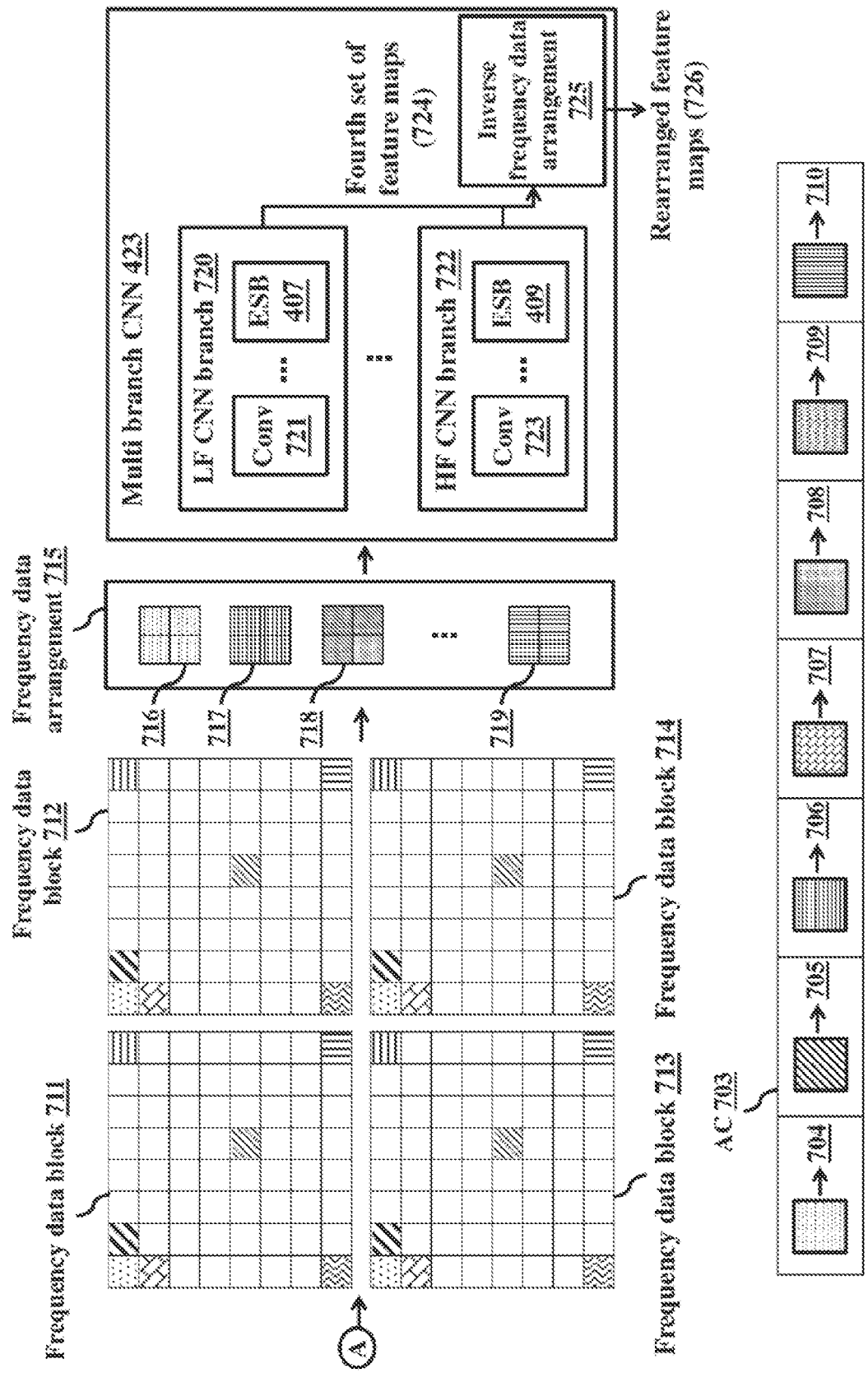

FIG. 7A and FIG. 7B illustrate a flow diagram of a method for creating a second set of feature maps of a low resolution image (e.g., LR image 303) by modifying the low resolution image using a frequency domain NN block (112), according to an embodiment. As shown in FIG. 7A, the LR image (303) is converted to a feature map (701) (e.g., by the pixel to frequency transformer (421)). The feature map (701) includes frequency components, e.g., Direct Current (DC) frequency components (702) and Alternate Current (AC) frequency components (703). Values of the DC frequency components (702) are zero, whereas values of the AC frequency components (703) are different, e.g., frequency components (704-710). Each block of the feature map (701) is a corresponding frequency component of each pixel in the LR image (303).

As shown in FIG. 7B, the feature map (701) is split into frequency data blocks (711-714) (e.g., by the frequency data classifier (422)) where a size of each frequency data blocks (711-714) is of same size. For example, a size of the feature map (701) is 16×16, then the feature map (701) may be split into 4 frequency data blocks (711-714) and the size of each frequency data blocks (711-714) will be 8×8. The frequency data classifier (422) classifies the AC frequency components (703) in the frequency data blocks (711-714) to multiple sets of frequency components (716-719) in a frequency data arrangement (715) based on the similarity of the value of the AC frequency components (703) in the frequency data blocks (711-714). The set of frequency components (716) includes the frequency components (704) with lower value of frequency (e.g. 20 Hz). The set of frequency components (717) includes the frequency components (705) with value of frequency higher than the frequency components (704) (e.g. 30 Hz). Thus, the set of frequency components (719) includes the frequency components (710) with value of frequency higher than all other frequency components (704-709) (e.g. 500 Hz).

The multi branch CNN (423) includes different CNN branches (720-722), where each CNN branch (720-722) is assigned to each set of frequency components (716-719) for generating a fourth set of feature maps (724) based on the value of the frequency components (716-719). For example, the Low Frequency (LF) CNN branch (720) is assigned to the set of frequency components (716) that includes the frequency components (704) with lower value of frequency (e.g. 20 Hz). Similarly, the High Frequency (HF) CNN branch (720) is assigned to the set of frequency components (719) that includes the frequency components (710) with higher value of frequency (e.g. 20 Hz). The LF CNN branch (720) generates the feature map of the set of frequency components (716) using a plurality of convolution layers (721) and the ESB (407). Similarly, the HF CNN branch generates the feature map of the set of frequency components (719) using a plurality of convolution layers (723) and the ESB (409).

The multi branch CNN (423) combines the feature maps from the CNN branches (720-722) to form the fourth set of feature maps (724). Further, a multi branch CNN (423) generates a rearranged feature maps (706) by performing inverse frequency data arrangement on the fourth set of feature maps (724). It's not possible to visualize the actual image content with the use of just the frequency domain data. Hence, the frequency domain data needs to be converted in to pixel domain to visualize the image content. Since the frequency coefficients are rearranged to enable enhanced learning by CNNs, these frequency coefficients needs to be rearranged back to the original spatial positions after the processing. This rearranging back step is for faithful inverse transform and faithful image content for visualization. Further, the multi branch CNN (423) provides the rearranged feature maps (706) to the refinement CNN for further processing on the rearranged feature maps (706). An image contains multiple frequencies, for example, a texture region contains high frequencies, a smooth region contains low frequencies, etc. So, learning filters of the CNN for the high and low frequencies separately will allow the CNN to generate the HR image with the optimal quality. The proposed method allows the ESBs (407-409) of each CNN branch (720-722) to learn features related to each AC frequency components (703).

Figure 8:
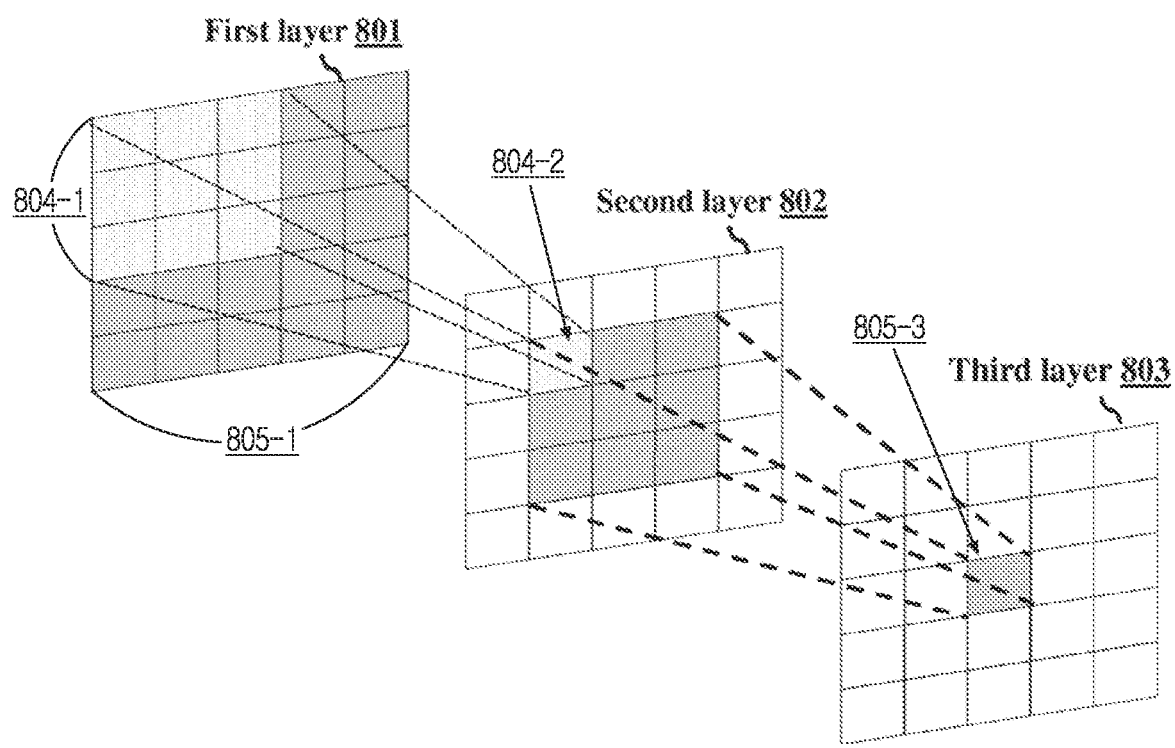
FIG. 8 illustrates a receptive field of a CNN with multiple layers, according to an embodiment.

FIG. 8 illustrates a receptive field of a CNN with multiple layers, according to an embodiment. A receptive field of a layer in the CNN is a size of a region in an input image or input feature map seen by a pixel in that layer, and a receptive field of the CNN is a size of a region in the input image or input feature map seen by a pixel in a last layer of the CNN. As shown in FIG. 8, each block in a first layer 801, second layer 802, and third layer 803 indicates a pixel. In an example, a pixel (804-2) in the second layer (802) may see a 3×3 region containing the pixels (804-1) in the first layer (801). Therefore, the receptive field of the second layer (802) is 3. A pixel (805-3) in the third layer (803) may see a 5×5 region containing the pixels (805-1) in the first layer (801). Therefore, the receptive field of the third layer (803) is 5. So, a deep-learning network with more depth (i.e., more layers) will have a bigger receptive field. A CNN with a bigger receptive field sees a bigger region in the input image or input feature map, which allows the CNN to learn important features of the image/feature map and generate the HR image (305) with optimal quality.

Figure 9A:
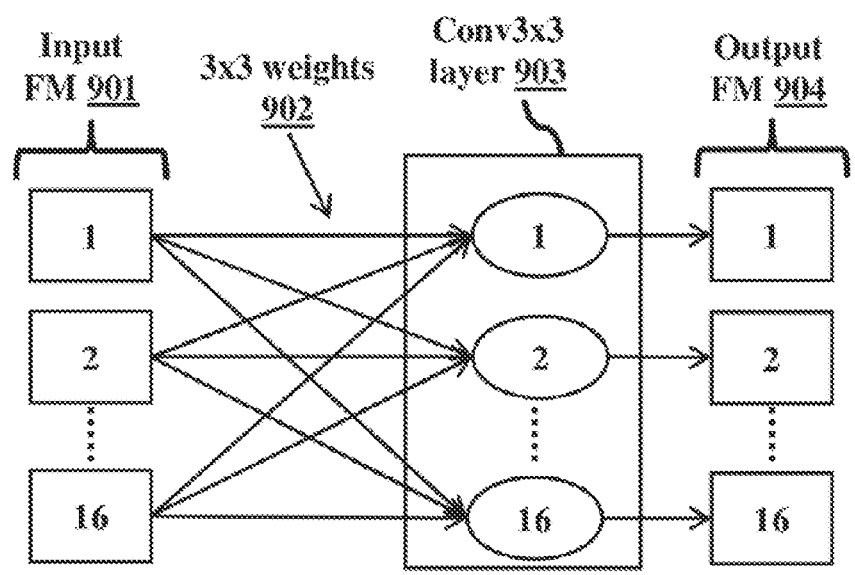
FIG. 9A and FIG. 9B illustrate a comparison of complexity of computations of a two dimensional convolution layer and an ESB for generating an output feature map, according to an embodiment.
Figure 9B:
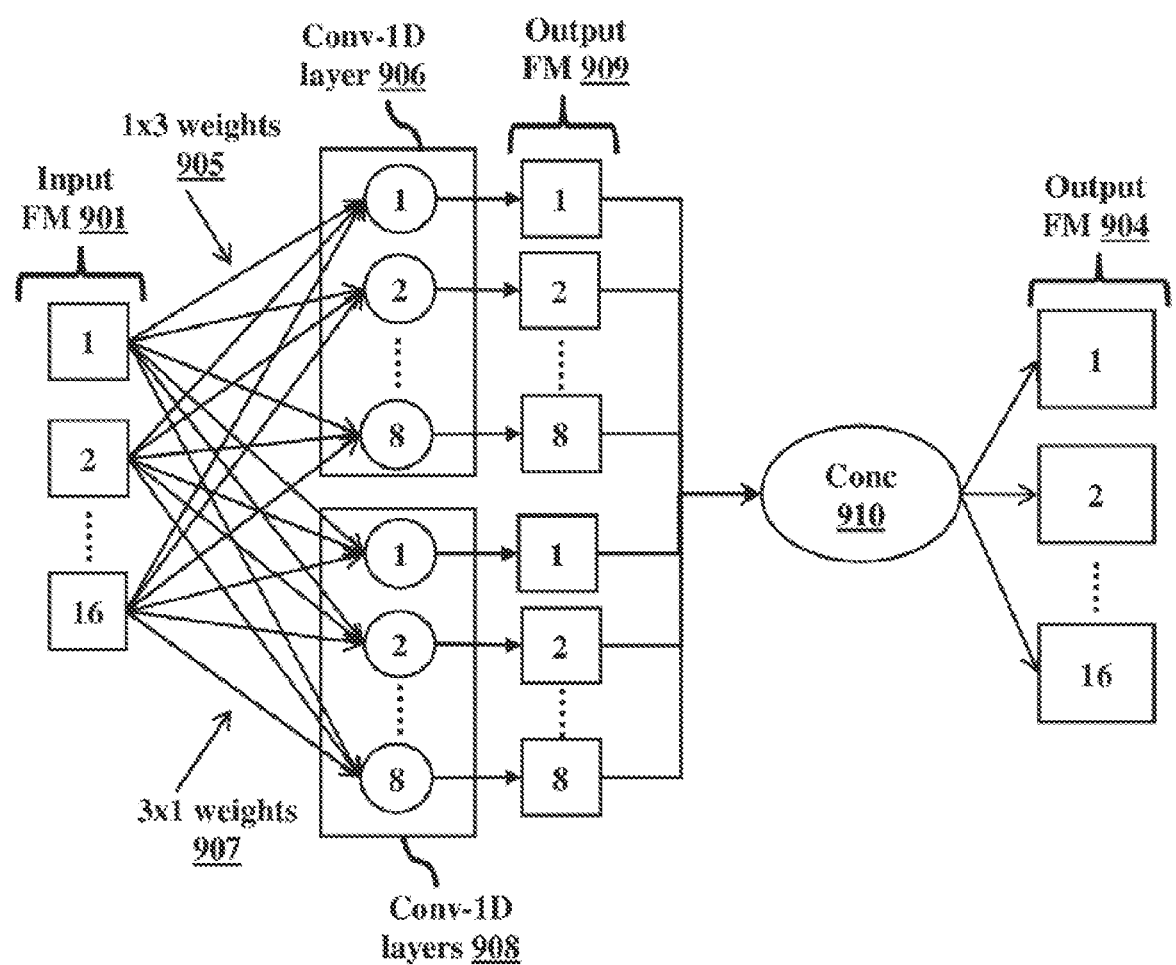

FIG. 9A and FIG. 9B illustrate a comparison of complexity of computations of a two dimensional convolution layer and an ESB for generating an output feature map, according to an embodiment. As shown in FIG. 9A, an output frequency map (FM) (904) is generated by a two dimensional convolution layer (903) (Conv3×3 layer) from an input FM (901), where the input FM (901) includes 16 input channels. The Conv3×3 layer (903) performs a two dimensional convolution on the input FM (901), where the Conv3×3 layer (903) includes 16 nodes. Each input channel provides an input to all the 16 nodes with 3×3 weights (902). An example of 3×3 weights is given below.

| +1 | +2 | +1 |
|----|----|----|
| 0  | 0  | 0  |
| -1 | -2 | -1 |

A total multiplication for generating the output FM (904) with 16 channels using the two dimensional convolution layer (903)=weights×number of input channel×number of output channel=(3×3)×16×16=2304.

As shown in FIG. 9B, the output FM (904) is generated by the ESBs (504, 507) from the input FM (901), where the input FM (901) includes 16 input channels. Conv-1D layers (906, 908) are the 1D convolution layers of the ESBs (504, 507). The conv-1D layers (906, 908) performs 1D convolution on the input FM (901), where each conv-1D layer (906, 908) includes 8 nodes. Each input channel provides the input to all the 8 nodes of the conv-1D layer (906) with 1×3 weights (905). Each input channel provides the input to all the 8 nodes of the conv-1D layer (908) with 3×1 weights (907). Each conv-1D layers (906, 908) generates an output FM (909) of 8 channels. Further, the output FM (909) of the conv-1D layers (906, 908) are concatenated to form the output FM (904). An example of 1×3 weights is given below.

| −5 | 1 | 3 |
|----|---|---|

An example of 3×1 weights is given below.

| 2  |
|----|
| -1 |
| 4  |

A total multiplication for generating the output FM (904) with 16 channels using the ESBs (504, 507)=(weights×number of input channel×number of output channel)×2=((1×3)×16×8)×2=768. Therefore, the computation for obtaining the output FM (904) with the ESBs (504, 507) is very less compared to the two dimensional convolution layer (903). The ESBs (504, 507) with the 1D convolution layers (906, 908) achieves similar or better quality compared to the two dimensional convolution layer (903) at a lower computational complexity.

Figure 10A:
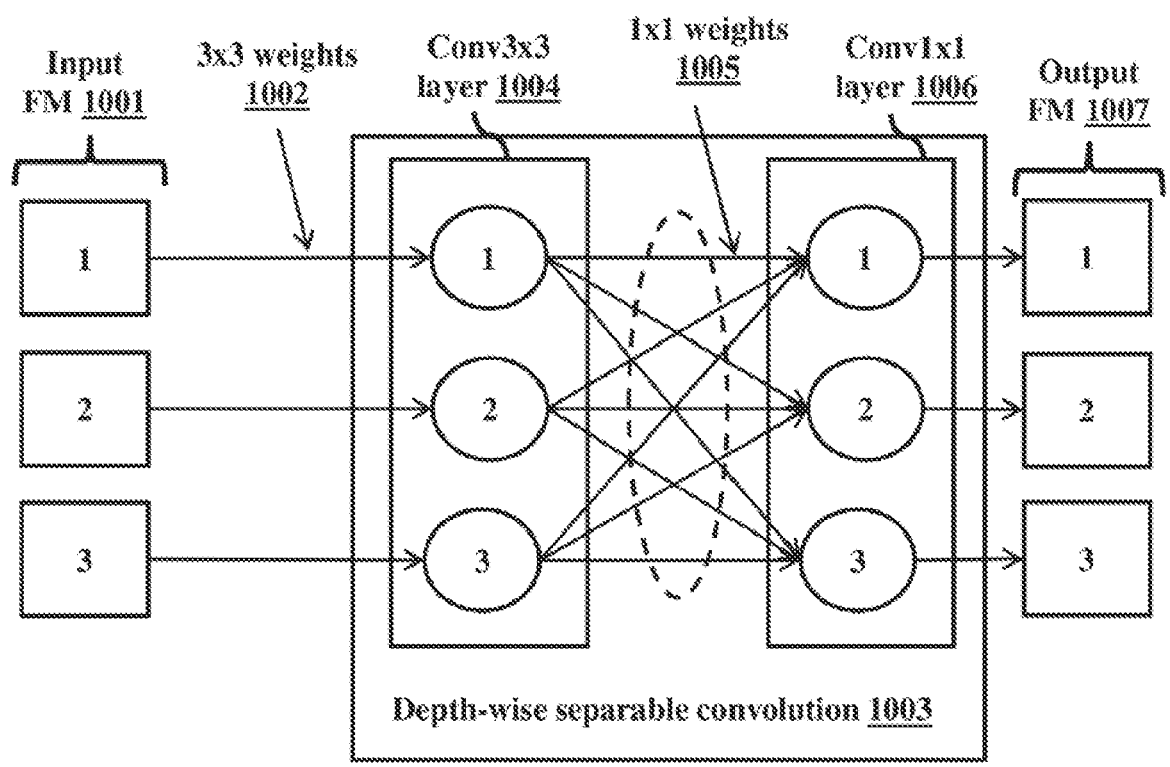
FIG. 10A and FIG. 10B illustrate a comparison of complexity of computations of a depth-wise separable convolution layer and an ESB for generating an output feature map, according to an embodiment.
Figure 10B:
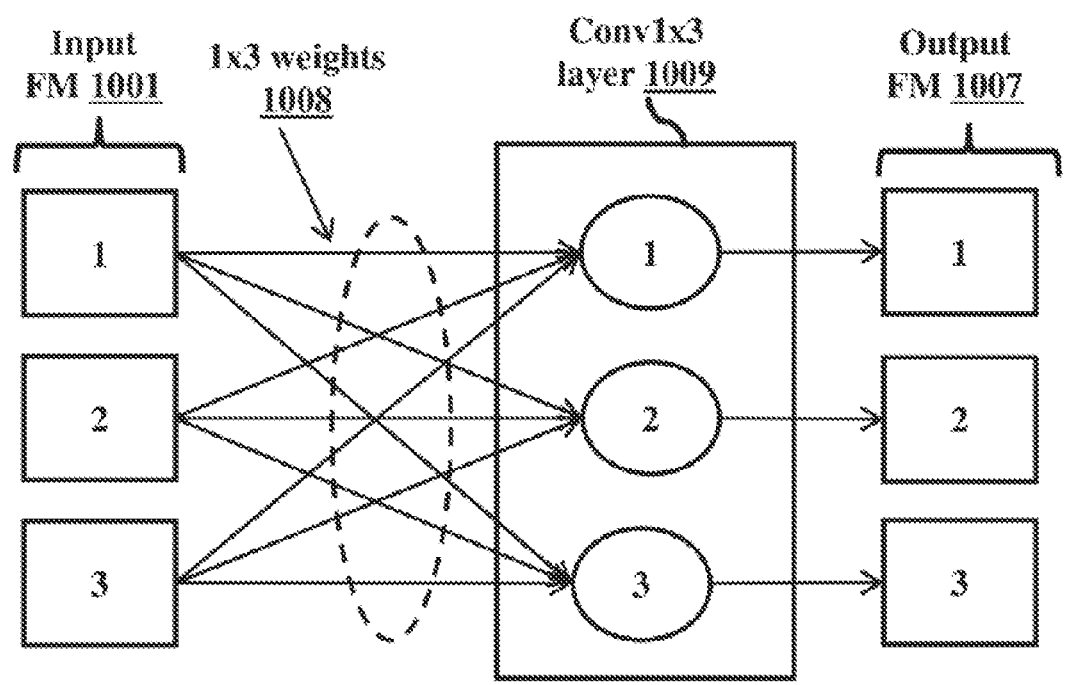

FIG. 10A and FIG. 10B illustrate a comparison of complexity of computations of a depth-wise separable convolution layer and an ESB for generating an output feature map, according to an embodiment. As shown in FIG. 10A, an output FM (1007) is generated by a depth-wise separable convolution layer (1003) from an input FM (1001), where the input FM (1001) includes 3 input channels. The depth-wise separable convolution layer (1003) includes a first convolution layer (1004) (conv3×3 layer) with a size 3×3 and a second convolution layer (1006) (conv1×1 layer) with a size 1×1. The conv3×3 layer (1004) performs the one-one 3×3 convolution on the input FM (901), where the conv3×3 layer (1004) includes 3 nodes. Each input channel provides an input to corresponding node of the conv3×3 layer (1004) with 3×3 weights (1002). All output of the conv3×3 layer (1004) is transferred to the conv1×1 layer (1006) with a 1×1 weights (1005). The conv1×1 layer (1006) performs fully connected pointwise 1×1 convolution on feature maps from the conv3×3 layer (1004) and generates the output FM (1007) contains 3 output values. A total multiplication for generating the output FM (1007) with 3 channels using the depth-wise separable convolution layer (1003)=(weights×number of output channel of the conv3×3 layer (1004))+(weights×number of input channel×number of output channel of the conv1×1 layer (1006)))=((3×3)×3)+((1×1)×3×3)=36.

As shown in FIG. 10B, the output FM (1007) is generated by the ESBs (504, 507) from the input FM (1001), where the input FM (1007) includes 3 input channels. A cony 1×3 layer (1009) is the 1D convolution layer of the ESBs (504, 507). The cony 1×3 layer (1009) performs 1D convolution on the input FM (1001), where the cony 1×3 layer (1009) includes 3 nodes. Each input channel provides the input to all the 3 nodes of the conv 1×3 layer (1009) with 1×3 weights (1008). The conv 1×3 layer (1009) generates the output FM (1007) of 3 channels. A total multiplication for generating the output FM (1007) with 3 channels using the ESB (504, 507)=(weights×number of input channel×number of output channel)=(1×3)×3×3=27. Therefore, the computation for obtaining the output FM (1007) in the ESBs (504, 507) is very less compared to the depth-wise separable convolution layer (1003). The ESBs (504, 507) with the 1D convolution layers (1009) achieves similar or better quality compared to the depth-wise separable convolution layer (1003) at the lower computational complexity by an intelligent structure of spatial and depth separable techniques. A comparison of various attributes of existing convolution methods and the ESB (504, 507) is given in table 1.

TABLE 1

|  | Complexity | Quality | Receptive field |
|---|---|---|---|
| Two dimensional convolution | High | High | High |
| Depth-wise separable convolution layer | Medium | Medium | High |
| ESB | Low | High | High |

The above-described embodiments may be implemented as programs executable on a computer, and be implemented by a general-purpose digital computer for operating the programs by using a non-transitory computer-readable medium. Data structures used in the above-described embodiments may be recorded on the computer-readable medium via a variety of means. The above-described embodiments of the disclosure may be implemented in the form of a non-transitory computer-readable recording medium including instructions executable by the computer, such as a program module executed by the computer. For example, methods implemented by software modules or algorithms may be stored in a computer-readable medium as computer-readable codes or program commands executable by the computer.

The non-transitory computer-readable recording medium may be any recording medium that are accessible by the computer, and examples thereof may include both volatile and non-volatile media and both detachable and non-detachable media. Examples of the computer-readable medium may include magnetic storage media (e.g., ROM, floppy disks, and hard disks) and optical recording media (e.g., compact disc-ROM (CD-ROM) and digital versatile discs (DVDs)), but are not limited thereto. Furthermore, the computer-readable recording medium may include a computer storage medium and a communication medium. A plurality of computer-readable recording media may be distributed over network-coupled computer systems, and data, e.g., program instructions and codes, stored in the distributed recording media may be executed by at least one computer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the scope of the disclosure as described herein.

What is claimed is:

1. A method for performing an artificial intelligence (AI) based zoom of an input image in an electronic device, the method comprising:
   receiving the input image;
   obtaining, through a pixel domain neural network (NN) block, a first set of feature maps of the input image based on pixels of the input image;
   converting pixels of the first set of feature maps of the input image to frequency components of the first set of feature maps;
   obtaining, through a frequency domain NN block, a second set of feature maps of the input image based on frequencies of the input image and the frequency components of the first set of feature maps; and
   obtaining, through a joint refinement NN block, a final image with a resolution higher than a resolution of the input image, based on the first set of feature maps and the second set of feature maps.

2. The method of claim 1, wherein the joint refinement NN block learns kernel weights during a training phase, and updates the kernel weights based on image characteristics in the first set of feature maps and the second set of feature maps, and
   wherein the joint refinement NN block comprises a set of edge synthesis blocks (ESBs).

3. The method of claim 2, wherein each of the ESBs comprises a plurality of cascaded one-dimensional (1D) convolution neural networks (CNNs), a plurality of depth-wise separable CNNs, and a concatenate layer.

4. The method of claim 3, wherein outputs of each set of cascaded 1D CNNs are input to corresponding depth-wise separable CNNs, and
   wherein outputs of the corresponding depth-wise separable CNNs are input to a final depth-wise separable CNN after performing concatenation on the outputs of the corresponding depth-wise separable CNNs using the concatenate layer.

5. The method of claim 1, wherein the obtaining the second set of feature maps of the input image comprises:
   converting the input image to frequency components of the input image;
   classifying the frequency components of the input image to at least one set of frequency components based on a similarity of the frequency components of the input image;
   determining a fourth set of feature maps for each set of frequency components using a first set of edge synthesis blocks (ESBs) in the frequency domain NN block;
   obtaining a fifth set of feature maps by filtering the fourth set of feature maps and the frequency components of the first set of feature maps using a second set of ESBs in the frequency domain NN block; and
   converting the fifth set of feature maps to the second set of feature maps based on pixels of the input image.

6. The method of claim 5, wherein the frequency components of the input image are classified to enable a deep learning model for learning in a frequency domain and extracting important features in local neighborhood characteristics.

7. The method of claim 5, wherein the first set of ESBs of the frequency domain NN block learns a local neighborhood frequency characteristics to reduce noise artefacts.

8. A method for performing an artificial intelligence (AI) based zoom of an input image in an electronic device, the method comprising:
   receiving the input image;
   obtaining, through a pixel domain neural network (NN) block, a first set of feature maps of the input image based on pixels of the input image;
   obtaining, through a frequency domain NN block, a second set of feature maps of the input image based on frequencies of the input image; and
   obtaining, through a joint refinement NN block, a final image with a resolution higher than a resolution of the input image, based on the first set of feature maps and the second set of feature maps,
   wherein the obtaining the first set of feature maps of the input image comprises:
   identifying a third set of feature maps of the input image using a first set of edge synthesis blocks (ESBs) of the pixel domain NN block;
   extracting edges in the input image;
   upscaling the edges to obtain a high resolution (HR) edge map; and
   obtaining the first set of feature maps of the input image by filtering the third set of feature maps and the HR edge map using a second set of ESBs of the pixel domain NN block.

9. The method of claim 8, wherein the first set of ESBs of the pixel domain NN block learns a horizontal edge feature and a vertical edge feature of the input image in separate network branches with one-dimensional (1D) convolution neural networks (CNNs).

10. The method of claim 8, wherein the first set of ESBs of the pixel domain NN block comprises a variable number of ESBs in cascaded arrangement with a local and global feature concatenation to learn edges in 360° directions.

11. The method of claim 8, wherein the second set of ESBs of the pixel domain NN block guides learned edge features in the third set of feature maps using the HR edge map to improve an edge consistency.

12. An electronic device for performing an artificial intelligence (AI) based zoom of an input image, the electronic device comprising:
a memory;
a processor; and
an image zoom controller operably coupled to the memory and the processor, and configured to:
receive the input image,
obtain, through a pixel domain neural network (NN) block, a first set of feature maps of the input image based on pixels of the input image,
convert pixels of the first set of feature maps of the input image to frequency components of the first set of feature maps,
obtain, through a frequency domain NN block, a second set of feature maps of the input image based on frequencies of the input image and the frequency components of the first set of feature maps, and
obtain, through a joint refinement NN block, a final image with a resolution higher than the input image, based on the first set of feature maps and the second set of feature maps.

13. The electronic device of claim 12, wherein the joint refinement NN block learns kernel weights during a training phase, and updates the kernel weights based on image characteristics in the first set of feature maps and the second set of feature maps, wherein the joint refinement NN block comprises a set of edge synthesis blocks (ESBs).

14. The electronic device of claim 12, wherein the image zoom controller is further configured to:
convert the input image to frequency components of the input image,
classify the frequency components of the input image to at least one set of frequency components based on a similarity of the frequency components of the input image,
obtain a fourth set of feature maps for each set of frequency components using a first set of edge synthesis blocks (ESBs) in the frequency domain NN block,
obtain a fifth set of feature maps by filtering the fourth set of feature maps and the frequency components of the first set of feature maps using a second set of ESBs in the frequency domain NN block, and
convert the fifth set of feature maps to the second set of feature maps based on pixels of the input image.

15. An electronic device for performing an artificial intelligence (AI) based zoom of an input image, the electronic device comprising:
a memory;
a processor; and
an image zoom controller operably coupled to the memory and the processor, and configured to:
receive the input image,
obtain, through a pixel domain neural network (NN) block, a first set of feature maps of the input image based on pixels of the input image,
obtain, through a frequency domain NN block, a second set of feature maps of the input image based on frequencies of the input image, and
obtain, through a joint refinement NN block, a final image with a resolution higher than the input image, based on the first set of feature maps and the second set of feature maps,
wherein the image zoom controller is further configured to:
obtain a third set of feature maps of the input image using a first set of edge synthesis blocks (ESBs) of the pixel domain NN block,
extract edges in the input image,
upscale the edges to obtain a high resolution (HR) edge map, and
obtain the first set of feature maps of the input image by filtering the third set of feature maps and the HR edge map using a second set of ESBs of the pixel domain NN block.

16. A non-transitory computer readable medium for storing computer readable program code or instructions for carrying out operations, when executed by a processor, for performing an artificial intelligence (AI) based zoom of an input image, the operations comprising:
receiving the input image;
obtaining a first set of feature maps of the input image based on pixels of the input image, as an output of a pixel domain neural network (NN) block by inputting the input image to the pixel domain NN block;
converting pixels of the first set of feature maps of the input image to frequency components of the first set of feature maps;
obtaining a second set of feature maps of the input image based on frequencies of the input image and the frequency components of the first set of feature maps, as an output of a frequency domain NN block by inputting the input image to the frequency domain NN block; and
obtaining a final image having a higher resolution than the input image, as an output of a joint refinement NN block by inputting the first set of feature maps of the input image and the second set of feature maps of the input image to the joint refinement NN block.

17. The non-transitory computer readable medium in claim 16, wherein the obtaining the second set of feature maps of the input image comprises:
converting the input image to frequency components of the input image;
classifying the frequency components of the input image to at least one set of frequency components based on a similarity of the frequency components of the input image;
obtaining a fourth set of feature maps for each set of frequency components using a first set of edge synthesis blocks (ESBs) in the frequency domain NN block;
obtaining a fifth set of feature maps by filtering the fourth set of feature maps and the frequency components of the first set of feature maps using a second set of Edge Synthesis Blocks (ESBs) in the frequency domain NN block; and
converting the fifth set of feature maps to the second set of feature maps based on pixels of the input image.

18. The non-transitory computer readable medium of claim 16, wherein the obtaining the final image having a higher resolution than the input image comprises:
producing a weighted combination of the first set of feature maps and the second set of feature maps.

19. The non-transitory computer readable medium of claim 18, wherein the producing the weighted combination of the first set of feature maps and the second set of feature maps comprises:

processing the first set of feature maps and the second set of feature maps to determine one or more features to enhance output quality of the final image;

updating kernel weights based on the determined one or more features; and producing the weighted combination of the first set of feature maps and the second set of feature maps based on the updated kernel weights.

20. A non-transitory computer readable medium for storing computer readable program code or instructions for carrying out operations, when executed by a processor, for performing an artificial intelligence (AI) based zoom of an input image, the operations comprising:

receiving the input image;

obtaining a first set of feature maps of the input image based on pixels of the input image, as an output of a pixel domain neural network (NN) block by inputting the input image to the pixel domain NN block;

obtaining a second set of feature maps of the input image based on frequencies of the input image, as an output of a frequency domain NN block by inputting the input image to the frequency domain NN block; and obtaining a final image having a higher resolution than the input image, as an output of a joint refinement NN block by inputting the first set of feature maps of the input image and the second set of feature maps of the input image to the joint refinement NN block, wherein the obtaining the first set of feature maps of the input image comprises:

obtaining a third set of feature maps of the input image using a first set of edge synthesis blocks (ESBs) of the pixel domain NN block;

extracting edges in the input image;

upscaling the edges to obtain a high resolution (HR) edge map; and obtaining the first set of feature maps of the input image by filtering the third set of feature maps and the HR edge map using a second set of ESBs of the pixel domain NN block.

* * * * *